United States Patent
Matter et al.

(10) Patent No.: US 6,963,809 B2
(45) Date of Patent: Nov. 8, 2005

(54) GAS METER

(75) Inventors: Daniel Matter, Brugg (CH); Philippe Prêtre, Baden-Dättwil (CH); Thomas Kleiner, Fislisbach (CH); Alexander Wenk, Zeihen (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/297,711

(22) PCT Filed: May 31, 2001

(86) PCT No.: PCT/CH01/00338

§ 371 (c)(1),
(2), (4) Date: Jun. 30, 2003

(87) PCT Pub. No.: WO01/96819

PCT Pub. Date: Dec. 20, 2001

(65) Prior Publication Data

US 2004/0030520 A1 Feb. 12, 2004

(30) Foreign Application Priority Data

Jun. 14, 2000 (EP) .......................... 00810511

(51) Int. Cl.⁷ .............................. G01F 1/00; G01F 1/74
(52) U.S. Cl. ..................................... 702/45; 73/861.04
(58) Field of Search ..................... 702/45, 60; 73/861, 73/861.02, 861.04, 195, 198

(56) References Cited

U.S. PATENT DOCUMENTS 5,323,657 A * 6/1994 Vander Heyden ........ 73/861.02

6,047,589 A   4/2000 Hammond et al.

FOREIGN PATENT DOCUMENTS

| CH | 19908664 A1 | 9/2000 |
|---|---|---|
| EP | 0469649 A2 | 2/1992 |
| EP | 0608514 A2 | 8/1994 |
| WO | 98/57131 | 12/1998 |
| WO | 99/06800 | 2/1999 |
| WO | 00/11465 | 3/2000 |

OTHER PUBLICATIONS

F. Mayer, "Single–Chip CMOS Anemometer", IEEE International Electron Devices Meeting (IEDM), Dec. 7–10, 1997, Washington, DC, 895–898.

Ulrich Wernekinck, "Gasmessung Und Gas–Abrechnung", Vulkan–Verlag Essen, 1996, ISBN 3–8027–5605–3.

* cited by examiner

*Primary Examiner*—John Barlow
*Assistant Examiner*—Meagan S Walling
(74) *Attorney, Agent, or Firm*—Buchanan Ingersoll PC; Burns Doane Swecker & Mathis

(57) ABSTRACT

A gas meter for determining a gas mixture consumption is revealed which determines sensor signal values proportional to a flow rate, this gas meter being calibrated as an energy measuring unit. The calibration is based on a basic gas mixture. During the measurement of the gas consumption, a measured energy consumption value is multiplied by a correction factor which takes account, at least approximately, of the calorific value of a supplied gas mixture, this calorific value being determined by an external unit. By this means, it is possible, using a simple and cost-efficient gas meter, to determine the effective supplied energy and to bill costs according to the supply.

8 Claims, 2 Drawing Sheets

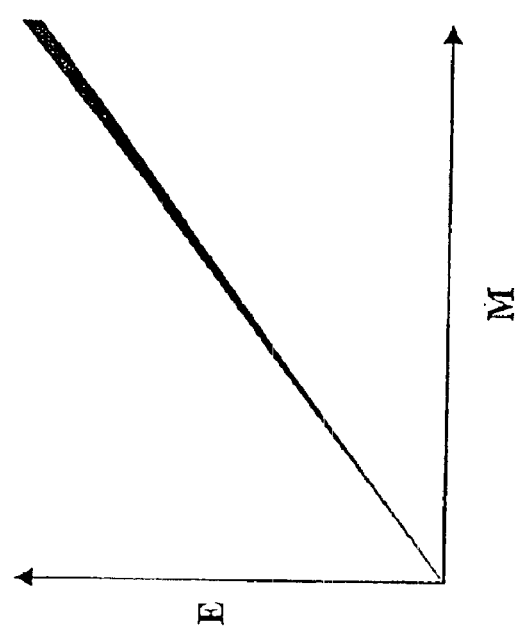
Fig. 3b
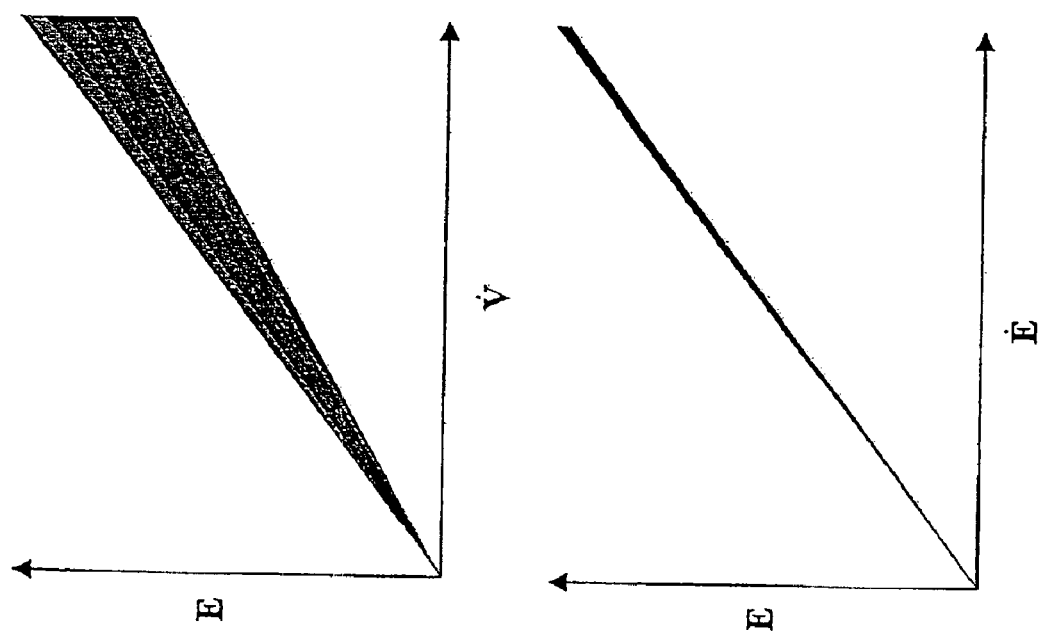
Fig. 3a
Fig. 3c

GAS METER

FIELD OF THE INVENTION

The invention relates to a method for determining consumption of a gas mixture and to a gas meter according to the preambles of patent claims 1 and 8, respectively. The method and the gas meter are suitable in particular for use in the domestic and commercial sector and in particular for determining the usage of natural gas.

BACKGROUND OF THE INVENTION

Currently, gas bills, in particular in the domestic and commercial sector, are based exclusively on the gas volume which has been used. Therefore, gas meters which are based directly on measuring the volume of the gas which has flowed through, in some cases compensating for measurement errors which arise through temperature changes, are primarily used.

The gas meter which is most frequently used is the so-called bellows gas meter as described by U. Wernekinck, Gasmessung and Gasabrechnung [Gas measurement and gas billing], Vulkan-Verl., 1996, 20–31. The bellows gas meter has two measuring chambers which are alternately filled and emptied again by the gas flowing through. While one chamber is being filled, it displaces the gas into the other. The filling and emptying steps are counted and, multiplied by the volume of the measuring chamber, result in the overall volume of the gas which has flown through. However, since the volume of the gas varies with changes in the ambient temperature and pressure; these measurements are subject to errors. In summer, when the gas is warm and takes up a larger volume, the consumer would pay more for the same, calorific value of the gas than in winter. For this reason, modern bellows gas meters are provided with simple mechanical or electrical devices for temperature compensation, in practice, however, these are rarely used. However, pressure fluctuations are not taken into account.

WO 99/06800 has disclosed a gas meter which determines a volumetric flow rate. For this purpose, in a gas pipe, a first thermistor detects the cooling behaviour and a second thermistor detects the current temperature of the gas, and a flow rate of the gas molecules is determined from these parameters. A cell in which the cooling behaviour of stationary gas is detected is also arranged in the pipe. Consequently, a calibration value can be obtained at any desired time when the gas pipe is operating. This calibration value can then in turn be used to determine the volumetric flow rate from the cooling behaviour of the first thermistor.

Despite all these compensatory measures, gas meters which are based on volumetric measurements are always prone to errors and lead to an incorrect gas bill. Moreover, a charging principle which is based on volumetric consumption is unfair to the consumer. This is because his gas consumption is determined not by the volume, but rather by the quantity of gas, i.e. the consumed mass of gas, and by the quality of the gas, i.e. its calorific value. The denser and the more high-quality the gas, the less volume is required to achieve the same efficiency, whether in a heating system, a hot-water system or a cooking area.

Therefore, German patent application No. 199 08 664.8, which has not yet been published, describes a gas meter which determines the gas mass flow rate and therefore takes account of the density of the gas. To do this, it is preferable to use an anemometer, as is known from F. Mayer et al., Single-Chip CMOS Anemometer, Proc. IEEE, International Electron Devices Meeting (IEDM, 1997), 895–898. The disclosure of these two documents forms part of the following description.

However, in the gas meters which have been described above, fluctuations in the quality of the gas are not taken into account. These fluctuations are considerable in particular in the gas of natural gas and arise primarily because the composition of the natural gas differs according to its source. However, in the supply of gas, gases from different sources are supplied in mixed form, and the mixing ratio may vary considerably depending on demand.

It is true that the prior art has disclosed appliances which take account of the calorific value of a gas and determine an energy consumption. For example, WO 00/11465 has disclosed an energy-measuring appliance which on the one hand has a bellows gas meter for measuring the volume and on the other hand has a device for determining the calorific value of a gas, this calorimetric device being based on an acoustic measurement principle. U.S. Pat. No. 6,047,589 has also disclosed an energy-measuring appliance which determines flow volume and calorific value of a gas; in this case, both measurements are based on the acoustic effect. Therefore, both energy-measuring appliances are calibrated for volume measurement, in each case carrying out a calculation using the calorific value which is currently measured on site and the volume measured value to obtain the desired energy value.

These energy-measuring appliances are therefore relatively complicated, having to carry out both a volume measurement and a determination of calorific value and, moreover, having to link the two measured values obtained. Appliances of this type are therefore too expensive for use as standard gas meters in the domestic and commercial sector.

SUMMARY OF THE INVENTION

Therefore, it is an object of the invention to provide a method for determining consumption of a gas mixture, and a gas meter, of the type described in the introduction, which make it easy to measure gas usage which is dependent on calorific value and which are therefore suitable for use in the domestic and commercial sector.

This object is achieved by a method and a gas meter having the features of patent claims 1 and 8, respectively.

The method according to the invention is based on the recognition that, when measuring a flow rate, in particular a mass flow rate, a measured value or sensor signal changes depending on the calorific value of the gas. This dependency has a fixed relationship which is a first-order proportional ratio. Consequently, it is possible to calibrate the gas meter according to the invention directly as an energy-measuring appliance.

Further corrections which take into account fluctuations in the composition of the gas mixture can be performed independently of the measurement of the gas meter. The determination of the required calorific value of an actually supplied gas mixture can be done by an external unit which is locally separate from the gas meter.

The advantage, therefore, is that it is not necessary for every gas meter to be equipped with a unit for determining the calorific value. A single external unit is sufficient to supply a plurality of consumers and therefore gas meters which are connected to the same gas mains with the required information about the calorific value of the gas mixture used.

In a preferred variant of the method according to the invention, this external unit transmits the information about the calorific value to the gas meter, and the gas meter itself carries out a correction to the measured energy consumption value on the basis of this information.

In another preferred variant of the method, the gas meter transmits the energy consumption value or an energy consumption value which has been totalled up over a defined period of time to a central control unit, in which this value is corrected using the information relating to the calorific value of the gas mixture used which was present during this period of time.

Further advantageous embodiments will emerge from the dependent patent claims.

BRIEF DESCRIPTION OF THE DRAWINGS

In the text which follows, the subject matter of the invention will be explained in more detail with reference to a preferred exemplary embodiment, which is illustrated in the appended drawings, in which:

FIG. 3a shows measured value errors with respect to an effective energy value of a gas for a volume measurement;

FIG. 3b for a mass flow measurement, and

FIG. 3c for an energy flow measurement according to the invention.

DETAILED DESCRIPTION OF THE INVENTION

Figure 1:
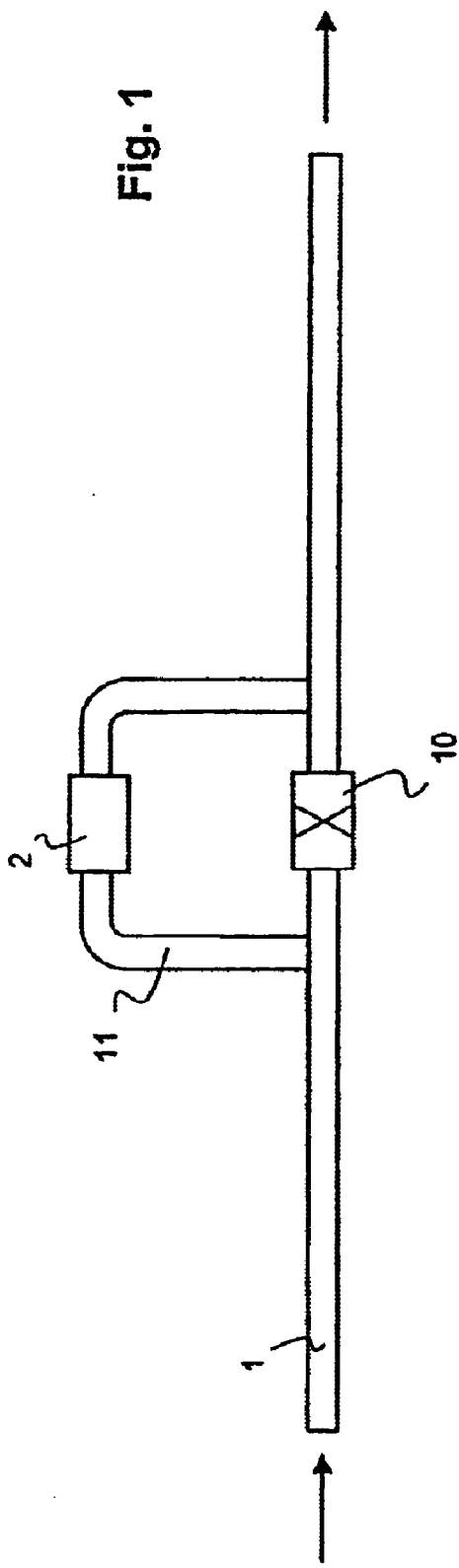
FIG. 1 shows an excerpt from a gas pipe having a gas meter according to the invention.

FIG. 1 shows a gas line which is provided with a gas meter according to the invention. The gas line comprises a principal pipe 1, which is connected to a gas mains pipeline which is outside the building and is not shown here. This principal pipe 1 has a pipe constriction 10 of defined cross section or has other means, introduced into the main conduit pipe 1, for achieving a well-defined pressure drop (pressure dropper). A gas flows through the gas line. The gas is generally a gas mixture, the composition of which varies. This is the case, for example, with natural gas, the three principal constituents of which, namely methane, propane and ethane, have a different weighting according to the origin of the gas. However, these three combustible principal constituents also have different calorific values, so that the calorific value of the resulting gas mixture fluctuates accordingly.

There is a gas meter which has a measuring means 2 for determining a gas mass flow and an evaluation electronics (not shown here). In a simple embodiment, the measuring means 2 is arranged directly in the principal or main conduit pipe 1. However, in the preferred embodiment illustrated here, a bypass pipe 11, which forms a bypass to the pipe constriction 10, branches off from the principal pipe 1. The measuring means 2 is arranged in this bypass pipe. The measuring means 2 is preferably an anemometer, preferably a CMOS anemometer with a polysilicon structure in sandwich form, as disclosed in the publications J. Robadey et al., Two dimensional integrated gas flow sensors by CMOS IC technology, J. Micromech. Microeng. 5(1995) 243–250, in F. Mayer et al., Scaling of thermal CMOS gas flow microsensors: experiment and simulation, Proc. IEEE Micro Electro Mechanical Systems, (IEEE, 1996), 116–121, and in F. Mayer et al., Single-Chip CMOS Anemometer, Proc. IEEE, International Electron Devices Meeting (IEDM, 1997) 895–898, and as proposed for use as a gas meter in the unpublished German patent application No. 199 08 664.8 which was mentioned in the introduction.

The measuring means 2 has a heating element and in each case one temperature sensor arranged upstream and downstream of the heating element, at identical distances, as seen in the direction of flow. A gas which is to be measured flows over the surface of the measuring means 2 and is heated by the heating element. The temperature sensors are used to measure the temperature or temperature difference of the gas upstream and downstream of the heating element, as seen in the direction of flow, resulting in a sensor signal S in the form of a voltage signal U, which is proportional to the temperature difference $\Delta T$. The heat transfer rate is dependent on the number of molecules per unit volume and therefore on the mass of gas. Moreover, however, it is also dependent on the calorific value of the gas mixture, i.e. on the type or composition of the gas mixture.

Figure 2:
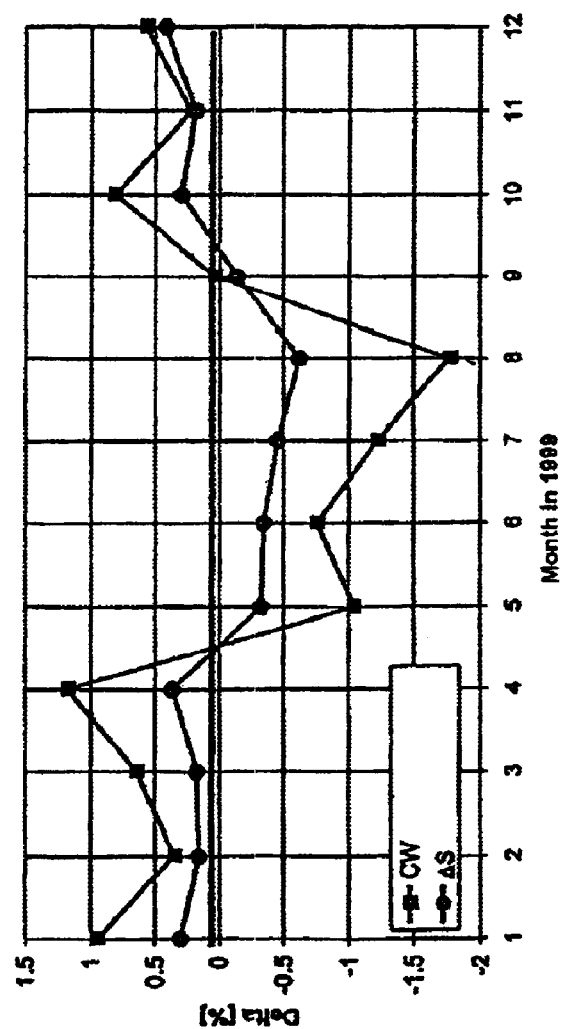
FIG. 2 shows a comparison of a deviation of monthly means for calorific values of natural gas and corresponding measured-value changes in the gas meter according to the invention.

According to the invention, the discovery that the sensor signal varies as a function of the calorific value of a gas mixture is now used. This takes place when the appliance is being calibrated as a volume measuring appliance and more particularly when the appliance is being calibrated as a mass flow meter. This dependency is illustrated in FIG. 2. In this, CW signifies a deviation in per cent of mean or average monthly values from the mean or average yearly value for the calorific value of natural gas. As can be seen, the calorific value fluctuates by approximately 2%. A change in the sensor signal value S which has been obtained by means of the measuring means 2 described above for a constant gas flow is also illustrated and is denoted by $\Delta S$. It can be seen that the sensor signal value changes in the same direction as and even almost proportionally to the calorific value. This relationship does not apply to monthly average values only but, of course, also applies to instantaneous values, i.e. for an arbitrarily small time scale.

According to the invention, therefore, the gas meter or the means for determining the mass flow can be calibrated or standardized as an energy-measuring appliance or unit. To do this, the procedure is as follows:

In a first step, a number of N sensor signal values $S((\dot{V}_{N_2,n})$ are determined as a function of a volume flow rate or mass flow rate for a calibration gas, this taking place under standard conditions, i.e. at a defined temperature (for example 20° C.) and a defined pressure (for example at 1 bar). As stated above, these sensor signal values are proportional to a gas mass flow rate for the measuring means 2 employed. The sensor signal values $S(\dot{V}_{N_2,n})$ are inverted and are stored in the evaluation electronics of the gas meter in the form of a sensor calibration curve $F_n(S(\dot{V}_{N_2,n}))$ as a flow rate depending on the sensor signal S.

The calibration gas used is preferably nitrogen $N_2$ or air. The sensor calibration curve $F_n(S(\dot{V}_{N_2,n}))$ is multiplied, in a second step, by a signal conversion or correction factor $fN_2$—CH and a calorific value factor $H_{CH}$ for a basic gas mixture, designated by the index CH, and is in turn stored. The signal conversion factor is in this case a conversion factor which takes account of the difference in the sensitivity of the measuring means 2 when using a base gas mixture instead of the calibration gas, in this case nitrogen. The calorific value factor $H_{CH}$ takes account of the calorific value of this base gas mixture, i.e. its calorimetric value or calorific value per unit of the flow parameter, i.e. per standard volume or per kg. The base gas mixture used is preferably an average gas mixture which is typical of the area where the gas meter is used.

$$P=P(S)=F_n(S(\dot{V}_{N_2,n}))\cdot f_{N_2\text{-}CH}\cdot H_{CH}$$

which indicates the instantaneous gas consumption as energy per unit time. Therefore, by integration or summing over a specific period of time, it is possible to determine the energy consumption E of a base gas mixture:

$$E=\int P(S)\cdot dt = f_{N_2\text{-}CH}\cdot H_n \cdot \int F_n(S(\dot{V}_{N_2,n}))\cdot dt$$

The gas meter is therefore already calibrated as a power or energy measuring unit based on the basic gas mixture. In its operation, fluctuations in time in the composition of the gas mixture consumed, i.e. deviations from the composition of the basic gas mixture are, namely, at least partially taken into account automatically by a corresponding fluctuation in the sensor signal S. For this purpose, it is not necessary to continually update the effective calorific value H, which fluctuates with time, or its deviation from the calorific value $H_{CH}$ of the basic gas mixture.

As may be seen from FIG. 2, the account taken of the fluctuations in the gas composition, as achieved by the calibration according to the invention, is indeed qualitatively correct but is not quantitatively perfect. A further improvement is achieved by using, instead of the calorific value $H_{CH}$ of the basic gas mixture, a calorific value $\overline{H}$, which at least approximately takes account of the calorific value of the gas mixture effectively drawn. The value $\overline{H}$ is, for example, determined by an appropriate averaging over an arbitrarily large interval. In order to determine the energy effectively supplied, therefore, the energy consumption value measured and calibrated in terms of the basic gas mixture is multiplied by a correction factor $\overline{H}/H_{CH}$.

This calorific value $\overline{H}$ is advantageously determined in an external unit, either by calculation or experimentally. This unit does not have to be located at the premises of the corresponding consumer, but rather it is possible to use a single unit for an entire consumer network. This may be part of a central facility or control unit or may be in communication therewith. Known means can be used to determine the calorific value. It is advantageous that it is also possible for accurate and expensive measuring means to be used for this purpose, since only a single appliance is required. Therefore, this external unit measures at all times or at set times the calorific value of the gas mixture flowing through the consumer network and stores this value.

In a variant of the invention, the external unit supplies the or each gas meter of the consumer network with information about the calorific value $\overline{H}$ of the gas mixture supplied. This may take place at predetermined time intervals or in the event of a significant change in the gas mixture. In this variant, the gas meter has calculation elements for correcting the measured energy consumption value using the information relating to the calorific value. In this case, the information comprises the correction factor, the calorific value or a code which can be assigned to the correction factor. In a preferred variant, the gas meter totals up the measured energy consumption value over a certain time span or interval i, for example a week or a month, and multiplies this value with the correction factor $\overline{H}(i)|H_{CH}$, which contains a calorific value $\overline{H}(i)$ averaged over the $i^{th}$ time interval. As a result, the following equation is obtained for the effective energy consumption over m time intervals:

$$E = f_{N_2\text{-}CH}\cdot\sum_{i=j}^{m}\left(\overline{H}(i)\cdot\int_i F_n(S(\dot{V}_{N_2,n}))\cdot dt\right)$$

and if in addition the signal conversion factors are averaged $$E = \sum_{i=j}^{m}\left(\overline{f}_{N_2\text{-}CH}(i)\cdot\overline{H}(i)\cdot\int_i F_n(S(\dot{V}_{N_2,n}))\cdot dt\right)$$

In another variant of the method, the gas meter transmits the measured energy consumption value to a central unit, which multiplies the measured energy consumption value by the correction factor. If the external unit is not integrated in the central unit, it also transmits information about the calorific value of the supplied gas mixture to the central unit. Preferably, the gas meter and/or the external unit total up and/or integrate their measured values over a defined period of time and transmit the integrated value to the central facility.

In all variants, the correction of the measured energy consumption value can be carried out at any desired time, i.e. including when the meter is being read.

By virtue of the direct calibration as an energy measuring appliance, the method according to the invention and the gas meter according to the invention allow inexpensive and fair charging for the gas used. The more accurate measurement method can be seen from FIGS. 3a to 3c. These figures show how great a deviation in a measured energy value from an effective energy value of a gas mixture is. FIG. 3a shows the situation in which a gas meter is calibrated for a gas volume flow measurement. The figure illustrates the volumetric flow rate $\dot{V}$ as a function of the energy E, in this case for a conventional bellows measuring appliance without additional temperature compensation. If the corresponding gas energy is determined from the volumetric flow using an appliance of this type, the error is up to ±18%. The principal causes for the error are temperature fluctuations, which generally amount to at most approximately ±10%, and pressure fluctuations of at most approximately ±5%. FIG. 3b shows a measurement error which has arisen from calibration based on the mass flow, for example using the measuring means 2 described above. This figure illustrates the mass flow rate $\dot{M}$ as a function of the energy E. The maximum error is approximately ±4%, approximately 2% resulting from the measuring appliance and a further approximately 2% from the fluctuation over time of the composition of the gas mixture or the calorific value. FIG. 3c shows the measurement error when using the measuring means 2 described above which is calibrated, in accordance with the invention, for the energy flow. The figure illustrates the energy flow rate or power $\dot{E}$ as a function of the energy E. As can be seen from the figures, an appliance which is directly calibrated for energy flow measurement reproduces the reality best, because, in this case, the measuring means corrects fluctuations with time in the composition of the gas mixture automatically in the correct sense or direction of the energy flow rate.

LIST OF REFERENCE SYMBOLS

1 Principal pipe
10 Pipe constriction
11 Bypass pipe
2 Measuring means
CW Deviation of monthly mean values
S Sensor signal value
ΔS Change in the sensor signal value S

What is claimed is:

1. A method for determining a gas mixture consumption by means of a gas meter, which comprises a measuring means for determining a gas mass flow rate and a measuring electronics, wherein for a direct calibration of the gas meter as a power or energy measuring unit sensor signal values ($S_n$) are determined as a function of a flow rate of a calibration gas ($N_2$ air) and are stored in the gas meter in the form of a sensor calibration curve ($Fn(Sn)$), the sensor calibration curve ($F_n(Sn)$) is multiplied by a signal conversion factor ($f_{N2-CH}$) and by a calorific value factor ($H_{CH}$) for a basic gas mixture (CH), and the product obtained determines a power (P) or an energy consumption value (E), wherein the signal conversion factor ($f_{N2-CH}$) takes account of the difference in sensitivity of the measuring means when using the basic gas mixture instead of the calibration gas ($N_2$ air) and wherein a measured energy consumption value (E) is multiplied by a correction factor ($\overline{H}/H_{CH}$), which takes account, at least approximately, of the calorific value ($\overline{H}$) of a supplied gas mixture.

2. The method as claimed in claim 1, wherein the calorific value ($\overline{H}$) of the supplied gas mixture is determined by an external unit.

3. The method as claimed in claim 2, wherein the external unit transmits to the gas meter information about the calorific value ($\overline{H}$) of the supplied gas mixture.

4. The method as claimed in claim 2, wherein the gas meter transmits to a central facility the measured energy consumption value and the external unit transmits to a central facility information about the calorific value ($\overline{H}$) of the supplied gas mixture.

5. The method as claimed in claim 2, wherein the external unit is the central facility.

6. The method as claimed in claim 1, wherein the correction factor ($\overline{H}/H_{CH}$) takes into account a calorific value ($\overline{H}$), determined over a certain time interval, of the supplied gas mixture.

7. A gas meter for determining a gas mixture consumption, the gas meter having a measuring means for determining a gas mass flow rate and having a measuring electronics, wherein the gas meter is calibrated as an energy measuring unit, wherein for a direct calibration of the gas meter as a power or energy measuring unit sensor signal values ($S_n$) are determined as a function of a flow rate of a calibration gas ($N_2$, air) and are stored in the gas meter in the for of a sensor calibration curve ($F_n(S_n)$), the sensor calibration curve ($F_nS_n$)) is multiplied by a signal conversion factor ($f_{N2-CH}$) and by a calorific value factor ($H_{CH}$) form a basic gas mixture (CH), and the product obtained determines a power (P) or an energy consumption value (E), wherein the signal conversion factor ($f_{N2-CH}$) takes account of the difference in sensitivity of the measuring means when using the basic gas mixture instead of the calibration gas ($N_2$, air), and wherein the measuring means is a CMOS anemometer.

8. The gas meter as claimed in claim 7, wherein the gas meter has correction means in order to multiply a measured energy consumption value by a correction factor ($\overline{H}/H_{CH}$), which takes account at least approximately of the calorific value ($\overline{H}$) of a supplied gas mixture.

* * * * *